United States Patent [19]

Reisch et al.

[11] Patent Number: 5,235,114

[45] Date of Patent: * Aug. 10, 1993

[54] PROCESS FOR PURIFYING AND END-CAPPING POLYOLS MADE USING DOUBLE METAL CYANIDE CATALYSTS

[75] Inventors: John W. Reisch; Michael M. Martinez, both of Guilford; Maurice Raes, Branford, all of Conn.

[73] Assignee: Olin Corporation, Cheshire, Conn.

[*] Notice: The portion of the term of this patent subsequent to Sep. 1, 2009 has been disclaimed.

[21] Appl. No.: 885,717

[22] Filed: May 18, 1992

Related U.S. Application Data

[63] Continuation-in-part of Ser. No. 692,753, Apr. 29, 1991, Pat. No. 5,144,093.

[51] Int. Cl.$^5$ ............................................. C07C 41/34
[52] U.S. Cl. .................................... 568/621; 568/618; 568/620
[58] Field of Search ...................... 568/618, 620, 621

[56] References Cited

U.S. PATENT DOCUMENTS

| | | | |
|---|---|---|---|
| 3,829,505 | 8/1974 | Herold | 260/611 B |
| 3,941,849 | 3/1976 | Herold | 260/607 |
| 4,335,188 | 6/1982 | Igi et al. | 428/458 |
| 4,355,188 | 10/1982 | Herold et al. | 568/620 |
| 4,472,560 | 9/1984 | Kuyper et al. | 526/120 |
| 4,477,589 | 10/1984 | van der Hulst et al. | 502/169 |
| 4,721,818 | 1/1988 | Harper et al. | 568/120 |
| 4,877,906 | 10/1989 | Harper | 568/621 |
| 5,144,093 | 9/1992 | Reisch et al. | 568/621 |

FOREIGN PATENT DOCUMENTS

| | | | |
|---|---|---|---|
| 406440 | 7/1990 | European Pat. Off. | |
| 2-265922A | 10/1990 | Japan | 568/621 |
| 2-265923A | 10/1990 | Japan | 568/621 |

*Primary Examiner*—Howard T. Mars
*Attorney, Agent, or Firm*—Dale Lynn Carlson

[57] ABSTRACT

A process for producing an ethylene oxide-capped polyol which is essentially free of catalyst residues, wherein the polyol is produced using a double metal cyanide catalyst, which comprises after polyol formation the steps of: (a) contacting a catalyst residue(s)-containing polyol with an effective amount of an oxidant (preferably selected from the group consisting of: oxygen-containing gas(es), peroxide(s), acids, and combinations thereof) to cause said catalyst residue(s) to form insoluble residues that are insoluble in the polyol; (b) separating the insoluble residues from the polyol to provide an essentially double metal cyanide catalyst residue-free polyol; (c) treating said double metal cyanide catalyst residue-free polyol with a base to provided a base-treated polyol; (d) contacting said base-treated polyol with ethylene oxide to produce an ethylene oxide-capped polyol containing base, wherein at least a portion of the secondary hydroxyl groups on said polyol are converted into primary hydroxyl groups, and (e) contacting said ethylene oxide-capped polyol containing base with an ion exchange resin in order to separate said base from said ethylene oxide capped polyol to provide a purified ethylene oxide capped polyol. In another aspect of the invention, the catalyst residue separation step is effected after EO-capping of the polyol.

17 Claims, No Drawings

PROCESS FOR PURIFYING AND END-CAPPING POLYOLS MADE USING DOUBLE METAL CYANIDE CATALYSTS

This application is a continuation-in-part of U.S. application Ser. No. 07/692,753, filed Apr. 29, 1991 now U.S. patent application Ser. No. 5,144,093.

BACKGROUND OF THE INVENTION

The use of double metal cyanide catalysts in the preparation of high molecular weight polyols is well-established in the art. For example, U.S. Pat. No. 3,829,505, assigned to General Tire & Rubber Company, discloses the preparation of high molecular weight diols, triols etc., using these catalysts. The polyols prepared using these catalysts can be fabricated to have a higher molecular weight and a lower amount of end group unsaturation than can be prepared using commonly-used KOH catalysts. The '505 patent discloses that these high molecular weight polyol products are useful in the preparation of nonionic surface active agents, lubricants and coolants, textile sizes, packaging films, as well as in the preparation of solid or flexible polyurethanes by reaction with polyisocyanates.

Polyols prepared using double metal cyanide catalysts contain catalyst residues that interfere with the subsequent use of the polyol in a subsequent polyurethane-forming reaction. More specifically, the catalyst residues will cause undesirable side reactions to form unwanted by-products such as allophanates. Attempts have been made in the past to remove the catalyst residues from the polyol after production of the polyol. For example, U.S. Pat. No. 4,355,188 teaches that removal of the double metal cyanide catalyst residues can be effected by adding to the polyol-residue mixture a strong base selected from potassium hydroxide, potassium metal, and sodium metal in order to convert the residues to ionic species, and adding ethylene oxide while the base is in contact with the polyol. The ionic species are then separated by filtration, for example by contact with an ion exchange resin, in order to provide a purified polyol essentially free of the residues. Unfortunately, the use and handling of sodium or potassium metal poses an unwanted fire and explosion hazard.

As another illustration, U.S. Pat. No. 4,721,818 discloses a process which comprises (a) incorporating into the catalyst residue-containing polyol an effective amount of an alkali metal hydride in order to convert the double metal cyanide complex catalyst into an insoluble ionic metal species separable from the polyol, and wherein the polyol hydroxyl groups are also converted to alkoxide groups, and (b) separating the insoluble ionic metal species from the polyol. Practical application of this process requires an intermediate step between steps (a) and (b) involving the incorporation of an effective amount of ethylene oxide ("EO") into the catalyst residue-containing polyol/alkali metal hydroxide mixture in order to "EO cap" the polyol, and hence convert the secondary hydroxyl groups of the polyol to primary hydroxyl groups. Unfortunately, when following this procedure, a relatively low percentage of primary hydroxyl groups is obtained using a conventional amount of base, as described more fully in Part C of the working example provided hereinbelow. If the amount of base is increased, the primary hydroxyl groups can also be increased; however, the base separation problem becomes more difficult.

As yet another illustration, U.S. Pat. No. 4,877,906 discloses a complicated method involving (a) treating a DMC catalyst residue-containing polyol with alkali metal compound(s), (b) filtering and (c) treating the filtered polyol with a phosphorous compound to convert the soluble portion of the DMC catalyst residue into an insoluble portion, (d) filtering again, and then (e) recovering the polyol. This process is not as simple and straightforward as might be desired, and the phosphorous compound itself can cause a residue problem in the polyol.

The processes disclosed in the above discussed patents have the disadvantage of being applicable only to specific polyols and utilizing treatment chemicals which themselves cause the formation of residues in the polyol. New approaches, for providing catalyst residue removal and efficient EO capping with a high percentage of primary hydroxyl groups in the polyol, that are inexpensive, generally applicable to all polyols, and do not themselves cause a residue problem would be highly desired by the polyol manufacturing community.

SUMMARY OF THE INVENTION

In one aspect, the present invention relates to a process for producing an ethylene oxide-capped polyol which is essentially free of catalyst residues, wherein the polyol is produced using a double metal cyanide catalyst, which comprises after polyol formation the steps of:

(a) contacting a catalyst residue(s)-containing polyol with an effective amount of an oxidant (preferably selected from the group consisting of: oxygen-containing gas(es), peroxide(s), acids, and combinations thereof) to cause said catalyst residue(s) to form insoluble residues that are insoluble in the polyol, (b) separating the insoluble residues from the polyol to provide an essentially double metal cyanide catalyst residue-free polyol, (c) treating said double metal cyanide catalyst residue-free polyol with a base to provided a base-treated polyol, (d) contacting said base-treated-polyol with ethylene oxide to produce an ethylene oxide-capped polyol containing base, wherein at least a portion of the secondary hydroxyl groups on said polyol are converted into primary hydroxyl groups, and (e) contacting said ethylene oxide-capped polyol containing base with an ion exchange resin in order to separate said base from said ethylene oxide capped polyol to provide a purified ethylene oxide capped polyol.

In another aspect, the present invention relates to a process for producing an ethylene oxide-capped polyol which is essentially free of catalyst residues, wherein the polyol is produced using a double metal cyanide catalyst, which comprises after polyol formation the steps of:

(a) contacting a catalyst residue(s)-containing polyol with an effective amount of an oxidant (preferably selected from the group consisting of: oxygen-containing gas(es), peroxide(s), acids, and combinations thereof) to cause said catalyst residue(s) to form insoluble residues that are insoluble in the polyol, (b) treating said insoluble residue-containing polyol with a base to provided a base-treated polyol, (c) contacting said base-treated polyol with ethylene oxide to produce an ethylene oxide-capped polyol wherein at least a portion of the secondary hydroxyl groups on said polyol are converted into primary hydroxyl groups, and (d) contacting said ethylene oxide-capped polyol containing said base and said insoluble residues with an ion exchange resin in order to separate said insoluble residues and said base from said ethylene oxide capped polyol to provide a purified ethylene oxide capped polyol which is essentially free of catalyst-residues.

These and other aspects will become apparent from a reading of the following detailed description of the invention.

DETAILED DESCRIPTION OF THE INVENTION

It has now been surprisingly found in accordance with the present invention that multi-step processes employing the use of an oxidant to insolubilize DMC catalyst residues in a polyol, followed by ethylene oxide (EO) capping of the polyol, provide a high purity EO-capped polyol. Using the processes of the present invention, the polyols are efficiently EO capped.

The oxygen-containing gas useful as an oxidant in the present invention is suitably any such gas, preferably oxygen, air, ozone, or a combination thereof, and the like.

The acid useful as an oxidant in the present invention is suitably any acid, such as a mineral acid or a Lewis acid such as sulfuric acid, phosphoric acid, hydrochloric acid, nitric acid, antimony pentachloride, boron trifluoroetherate, toluene sulfonic acid, combinations thereof, and the like. The preferred acid is sulfuric acid.

The peroxide useful as an oxidant in the process of the present invention is suitably any peroxide, or hydroperoxide such as hydrogen peroxide, t-butyl peroxide, t-butyl peroxypivalate, decanoyl peroxide, lauroyl peroxide, propionyl peroxide, acetyl peroxide, combinations thereof, and the like.

The treatment time for contacting the DMC catalyst-containing polyol with the oxidant is generally between a few minutes or less and ten hours or more, preferably between about one and about four hours. The treatment temperature is suitably between 70° C. and about 140° C., preferably between about 90° C. and about 120° C.

The oxidant(s) is generally employed, if in liquid form, in a total amount of between about 5% and about 0.02%, preferably between about 0.40% and about 0.15% based upon the total weight of the polyol and may be adjusted based upon the total amount of DMC catalyst residue in the polyol. If a gaseous oxidant is employed, it is used in an amount sufficient to cause formation of the insoluble catalyst residues.

In a particularly advantageous aspect of the present invention, an oxygen-containing gas or hydrogen peroxide is utilized in combination with sulfuric acid to produce enhanced efficacy of separation of the treated DMC catalyst residue from the polyol. Alternatively, sulfuric acid or hydrogen peroxide are utilized singly to provide good separation of the catalyst residue from the polyol.

The base useful in the processes of the present invention is suitably selected from the group consisting of alkali metal hydroxides, alkaline earth metal hydroxides, alkali metal hydrides, alkaline earth metal hydrides, alkali metal alkoxides containing between one and eight carbon atoms per molecule, alkaline earth metal alkoxides, and combinations thereof. The alkali metal alkoxides and alkaline earth metal alkoxides useful in the process of the present invention generally have between one and 23, preferably between one and eight, more preferably between one and six, carbon atoms per molecule. Suitable alkali metal alkoxides include, for example, sodium methoxide, potassium methoxide, lithium methoxide, as well as the ethoxides, propoxides, butoxides, pentoxides, dodecyloxides, and the like. Suitable alkaline earth metal alkoxides include, for example, the calcium and magnesium salts of the above-mentioned alkoxides. Other useful bases include sodium hydroxide, potassium hydroxide, sodium hydride, potassium hydride, and combinations thereof, with the preferred base being sodium hydroxide. Molar ratios of hydroxyl groups on the polyol to alkali metal alkoxide or alkaline earth metal alkoxide of from 1:1 to 500:1 are contemplated. In order to enhance the rate of the ethylene oxide capping catalyzed by the base it is desirable to heat the mixture. Heating at a temperature within the range of from about 40° C. to about 150° C. until a substantial portion of the ethylene oxide has reacted as evidenced by a drop in pressure, typically between about one to about eight hours has been found advantageous. Removal of base from the polyol is preferably effected by treatment with a silicate compound, as described more fully hereinbelow.

The polyols utilized in the present invention are typically prepared by condensing an alkylene oxide, or a mixture of alkylene oxides using random or step-wise addition, with a polyhydric initiator or mixture of initiators, in the presence of a double metal cyanide catalyst. Illustrative alkylene oxides include ethylene oxide, propylene oxide, butylene oxide, amylene oxide, aralkylene oxides such as styrene oxide, and combinations thereof, and the like. The most preferred alkylene oxide is propylene oxide or a mixture thereof with ethylene oxide using random or step-wise oxyalkylation.

The polyhydric initiator used in preparing the polyol reactant includes the following and mixtures thereof: the aliphatic triols such as glycerol, propoxylated glycerol adducts, trimethylolpropane, triethylolpropane, trimethylolhexane, and diols such as ethylene glycol, 1,3-propylene glycol, dipropylene glycol, butylene glycols, propoxylated glycol adducts, butane diols, pentane diols, and the like.

The alkylene oxide-polyhydric initiator condensation reaction is carried out in the presence of a double metal cyanide catalyst. Without wishing to be bound by any particular theory, it is speculated by the present inventor that unsaturated end groups result in monofunctional species that act as chain stoppers in elastomer formation. In polyol synthesis with KOH catalysis the unsaturation formed increases as a direct function of equivalent weight. Eventually conditions are established wherein further propylene oxide addition fails to increase the molecular weight. In other words the use of alkali catalysts to produce high molecular weight, hydroxy terminated polyoxypropylene ethers results in a substantial loss in hydroxy functionality. With double metal cyanide catalysis much less unsaturation is formed allowing higher equivalent weight polyols to be prepared.

The double metal cyanide complex class catalysts suitable for use and their preparation are described in U.S. Pat. Nos. 4,472,560 and 4,477,589 to Shell Chemical Company and U.S. Pat. Nos. 3,941,849 and 4,335,188 to General Tire & Rubber Company. The teachings of the foregoing patents are incorporated herein by reference.

Double metal cyanide complex catalysts found particularly suitable for use are zinc hexacyanometallates of formula:

$$Zn_3[M(CN)_6]_2 \cdot xZnCl_2 \cdot ySOLVENT \cdot zH_2O$$

wherein M may be Co(III), or Cr(III) or Fe(II) or Fe(III); x, y, and z may be fractional numbers, integers, or zero and vary depending on the exact method of preparation of the complex, preferably each independantly being between 0 and 15, and the solvent is preferably an ether, such as glyme or diglyme, or an alcohol, such as ethanol, isopropanol, n-propanol, t-butanol, isobutanol, or n-butanol.

After the double metal cyanide complex catalyst residue has been converted to the insoluble ionic metal species, it can optionally be separated from the polyol by conventional methods such as filtration using, for example, diatomaceous earth, or passing through an acidic ion exchange resin as taught in U.S. Pat. No. 4,355,188.

After the polyol has been treated with a base to produce a base-treated polyol and allowed to react with ethylene oxide to produce an EO-capped polyol, the base is separated from the polyol. Separation is suitably effected utilizing well-known ion exchange techniques, preferably using an acidic cationic exchange resin which are suitably commercially available as silica gels, and the like. Suitable commercial ion exchange resins include AMBERLYST® 15 acidic macroreticular resin, SEPHADEX-CM® C-25 ion exchange resin, or Dow Chemical Corporation's DOWEX® 50X2-400 acidic ion exchange resin.

As used herein, the term "molecular weight" is intended to designate number average molecular weight.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited are incorporated herein by reference in their entirety.

EXAMPLE 1

Part A—Preparation of a High Molecular Weight Polyol Using a Double Metal Cyanide Catalyst A propoxylated glycerine precursor 100 g (133.6 eq. wt., 0.748 eq) was added to a 1 liter autoclave. Zinc hexacyanocobaltate (0.3 g) was added and the autoclave was flushed with nitrogen three times. The mixture was heated to 100° C. Propylene oxide (30 g) was added and it reacted as evidenced by a drop in pressure. Propylene oxide was fed into the reactor at a rate to maintain the pressure below 20 psi. 609.0 g of PO was added within two hours. At this point 548 g of the mixture was removed to allow space for more epoxide leaving 162.1 grams in the reactor. An additional 340 g of propylene oxide was added over a period of 1.5 hours to produce a polyol containing predominantly secondary hydroxyls with a molecular weight of 10,000, hydroxyl number 16.8.

Part B (Comparative Example)—EO Capping in Presence of Double Metal Cyanide Catalyst—Low Percentage of Primary Hydroxyl Groups Obtained A polyol containing active double metal cyanide catalyst which was prepared as described in Part A above was heated to 110° C. and ethylene oxide (50 g, 10 wt. %) was added. The mixture was allowed to react for 3 hours at which time the pressure was no longer decreasing. MAGNESOL (5.5 g) and CELITE (2.8 G) were added and the mixture was heated at ambient pressure for one hour then vacuum stripped for one hour and filtered. The polyol was analyzed and found to contain 28% primary hydroxyl groups.

Part C (Comparative Example)—EO Capping by Adding KOH to a Polyol Containing Double Metal Cyanide Catalyst;

Low Percentage of Primary Hydroxyl Obtained

A polyol containing active DMC catalyst, which was prepared as described in part A above, was combined with KOH (0.75 g, 0.15 wt. %). Ethylene oxide (50 g, 10 wt. %) was added and the mixture was allowed to react for 3 hours at which time the pressure was no longer decreasing. The polyol was treated with MAGNESOL 5.5 g and CELITE 2.8 g and allowed to stir at ambient pressure for one hour, then vacuum stripped for 2 hours and filtered. The polyol was analyzed and found to contain 37% primary hydroxyl groups.

Part D—Removal of Double Metal Cyanide Catalyst by Peroxide Treatment Followed by EO Capping using KOH—High Percentage of Primary Hydroxyl Groups Obtained A polyol containing active double metal cyanide catalyst, which was prepared as described in Example 1, was heated to 110° C. and 30% hydrogen peroxide (3.0 g, 0.2 wt. % $H_2O_2$) was added. The mixture was heated at 110° C. for one hour and then CELITE (10 g, 2 wt. %) was added and the mixture was vacuum stripped for one hour and then filtered. The polyol was analyzed by X-ray fluorescence and found to contain 0 ppm cobalt and 0 ppm zinc.

KOH (0.75 g, 0.15 wt. %) was added and the mixture was vacuum stripped in an autoclave at 100° C. for one hour. Ethylene oxide (50 g, 10 wt. %) was added and the mixture was allowed to react for 3 hours to provide an ethylene oxide ("EO")-capped polyol containing base.

Part E—Proposed Purification of the EO-Capped Polyol Using an Ion Exchange Resin The EO-capped polyol containing base is contacted with an ion exchange resin, such as Dow Chemical's DOWEX® acidic cationic exchange resin, to remove the base from the EO-capped polyol. Essentially all of the base is removed from the polyol to provide a purified polyol. The polyol is analyzed and found to contain 75% primary hydroxyl groups.

What is claimed is:

1. In a process for producing an ethylene oxide-capped polyol which is essentially free of catalyst residues, wherein the polyol is produced using a double metal cyanide catalyst, the improvement which comprises after polyol formation the steps of:
   (a) contacting a catalyst residue(s)-containing polyol with an effective amount of an oxidant selected from the group consisting of: oxygen-containing gas(es), peroxide(s), sulfuric acid, and combinations thereof, to cause said catalyst residue(s) to form insoluble residues that are insoluble in the polyol, (b) separating the insoluble residues from the polyol by a method selected from the group consisting of filtration and ion exchange separation to provide an essentially double metal cyanide catalyst residue-free polyol, (c) treating said double metal cyanide catalyst residue-free polyol with a base to provide a base-treated polyol, and vacuum stripping said base-treated polyol, (d) contacting said base-treated polyol with ethylene oxide to produce an ethylene oxide-capped polyol containing base, wherein at least a portion of the secondary hydroxyl groups on said polyol are converted into primary hydroxyl groups, and (e) contacting said ethylene oxide-capped polyol containing base with an ion exchange resin in order to separate said base from said ethylene oxide capped polyol to provide a purified ethylene oxide capped polyol.

2. The process of claim 1 wherein said base is employed in an amount sufficient to provide a molar ratio of hydroxyl groups on the polyol to equivalents of base of between 1:1 and 500:1.

3. The process of claim 1 wherein said base is an alkali metal alkoxide or alkaline earth metal alkoxide contains between one and 23 carbon atoms per molecule on said alkoxide.

4. The process of claim 1 wherein said base is selected from the group consisting of alkali metal hydroxides, alkaline earth metal hydroxides, alkali metal hydrides, alkaline earth metal hydrides, alkali metal alkoxides containing between one and eight carbon atoms per molecule, alkaline earth metal alkoxides containing between one and eight carbon atoms per molecule, and combinations thereof.

5. The process of claim 1 wherein said base contains a metal ion selected from the group consisting of the sodium, potassium, lithium, calcium, and magnesium salts of methoxide, ethoxide, propoxide, butoxide, pentoxide, hexaoxide, and combinations thereof.

6. The process of claim 1 wherein the separation of step (b) is effected using filtration employing an ion exchange resin.

7. The process of claim 1 wherein said resin of step (e) is an acidic cationic exchange resin.

8. The process of claim 1 which further comprises the additional step of removing any by-product alcohol from said purified polyol by fractionally distilling said purified polyol.

9. In a process for producing an ethylene oxide-capped polyol which is essentially free of catalyst residues, wherein the polyol is produced using a double metal cyanide catalyst, the improvement which comprises after polyol formation the steps of:

(a) contacting a catalyst residue(s)-containing polyol with an effective amount of an oxidant selected from the group consisting of: oxygen-containing gas(es), peroxide(s), sulfuric acid, and combinations thereof, to cause said catalyst residue(s) to form insoluble residues that are insoluble in the polyol, (b) treating said insoluble residue-containing polyol with a base to provide a base-treated polyol, and vacuum stripping said base-treated polyol, (c) contacting said base-treated polyol with ethylene oxide to produce an ethylene oxide-capped polyol wherein at least a portion of the secondary hydroxyl groups on said polyol are converted into primary hydroxyl groups, and (d) contacting said ethylene oxide-capped polyol containing said base and said insoluble residues with an ion exchange resin in order to separate said insoluble residues and said base from said ethylene oxide capped polyol to provide a purified ethylene oxide capped polyol which is essentially free of catalyst-residues.

10. The process of claim 9 wherein said base is employed in an amount sufficient to provide a molar ratio of hydroxyl groups on the polyol to equivalents of base of between 1:1 and 500:1.

11. The process of claim 9 wherein said base is an alkali metal alkoxide or alkaline earth metal alkoxide contains between one and 23 carbon atoms per molecule on said alkoxide.

12. The process of claim 9 wherein said base is selected from the group consisting of alkali metal hydroxides, alkaline earth metal hydroxides, alkali metal hydrides, alkaline earth metal hydrides, alkali metal alkoxides containing between one and eight carbon atoms per molecule, alkaline earth metal alkoxides containing between one and eight carbon atoms per molecule, and combinations thereof.

13. The process of claim 9 wherein said base contains a metal ion selected from the group consisting of the sodium, potassium, lithium, calcium, and magnesium salts of methoxide, ethoxide, propoxide, butoxide, pentoxide, hexaoxide, and combinations thereof.

14. The process of claim 9 wherein the ion exchange resin of step (d) is an acidic cationic exchange resin.

15. The process of claim 9 which further comprises the additional step of removing any by-product alcohol from said purified polyol by fractionally distilling said purified polyol.

16. The process of claim 1 wherein said oxidant is selected from the group consisting of hydrogen peroxide, sulfuric acid, and combinations thereof.

17. The process of claim 9 wherein said oxidant is selected from the group consisting of hydrogen peroxide, sulfuric acid, and combinations thereof.

* * * * *